United States Patent
Tom

(10) Patent No.: US 10,353,792 B2
(45) Date of Patent: Jul. 16, 2019

(54) DATA LAYERING IN A NETWORK MANAGEMENT SYSTEM

(71) Applicant: FireMon, LLC, Overland Park, KS (US)

(72) Inventor: Darren C Tom, San Jose, CA (US)

(73) Assignee: FireMon, LLC, Overland Park, KS (US)

( * ) Notice: Subject to any disclaimer, the term of this patent is extended or adjusted under 35 U.S.C. 154(b) by 163 days.

(21) Appl. No.: 15/710,905

(22) Filed: Sep. 21, 2017

(65) Prior Publication Data

US 2019/0087296 A1 Mar. 21, 2019

(51) Int. Cl.
| | | |
|---|---|---|
| *G06F 15/173* | (2006.01) | |
| *G06F 11/30* | (2006.01) | |
| *H04L 29/08* | (2006.01) | |
| *G06F 11/34* | (2006.01) | |
| *G06F 16/27* | (2019.01) | |
| *G06F 16/903* | (2019.01) | |

(52) U.S. Cl.
CPC ...... *G06F 11/3006* (2013.01); *G06F 11/3409* (2013.01); *G06F 16/27* (2019.01); *G06F 16/903* (2019.01); *H04L 67/36* (2013.01)

(58) Field of Classification Search
CPC ............................. H04L 67/36; G06F 11/3006
USPC ......................................................... 709/224
See application file for complete search history.

(56) References Cited

U.S. PATENT DOCUMENTS

| | | | | |
|---|---|---|---|---|
| 7,991,876 B2* | 8/2011 | Yoda | ....................... | H04L 67/22 370/352 |
| 8,059,548 B1* | 11/2011 | Bisarya | ............... | G06F 11/3006 370/242 |
| 2006/0253566 A1* | 11/2006 | Stassinopoulos | ..... | H04L 41/042 709/224 |
| 2009/0271510 A1* | 10/2009 | Goel | ................... | H04L 41/0803 709/224 |

OTHER PUBLICATIONS

Immediate Insight User's Guide, Dec. 2015, Firemon LLC. (Year: 2015).*

* cited by examiner

*Primary Examiner* — Hee Soo Kim
(74) *Attorney, Agent, or Firm* — Polsinelli PC

(57) ABSTRACT

Aspects of the present disclosure involve systems and methods for summarizing large amounts of data over time into one or more data layers. The systems and methods provide for storing data from a large data feed, which may include machine-sourced and human-sourced information, into one or more layers that are defined by layer parameters. A user of an interface may provide various parameters that define the portion or portions of the raw data feed to be included in the layer. With the received parameters, the system may analyze the raw data feed as it is received at the monitoring or collecting system to identify instances of data that match the received parameters. Through the system, data from a large raw data feed is searched and made available to a network administrator for easier management of the network without consuming vast network resources and administrator time.

24 Claims, 10 Drawing Sheets

DATA LAYERING IN A NETWORK MANAGEMENT SYSTEM

TECHNICAL FIELD

Aspects of the present disclosure relate generally to management of large data applications, and more particularly to automatically summarizing or sorting large amounts of data over a time period for use by a user of the large data amounts.

BACKGROUND

Large networks of interconnected computing devices or components are becoming more and more common. The "Internet" or the World Wide Web (the "Web") may be considered such a computing network that is easily accessible using numerous possible computing devices. In general, any network of interconnected computing devices that communicate among each other to convey information between the devices and/or users of the network may be considered a large network. Such networks may be available to the public (such as the Internet) or may be privately managed (such as networks owned and operated by corporations or other network administrators). For many networks, one or more administrators, managers, and/or network engineers may monitor or otherwise manage the performance of the network and network devices to ensure proper operation of the network.

Monitoring a network performance may include log collection/analytics products deployed in the network to receive and process events and data generated by the devices of the network. Such collection products generally receive packets of information from one or more of the components of the network in response to events that occur within the network. For example, a server of the network may experience of a high volume of traffic and, in response, provide an indication of the high volume of traffic to a collection product. In other examples, the component may provide a report of one or more operating statuses of the component. This information may be gathered by the collection products and stored for use and analysis by administrators of the network. In response to the received and stored events, the administrator may perform one or more remediation procedures to ensure the proper operation of the network. In this manner, a Network Operation Center (NOC) with one or more network administrators may monitor the performance of the network and respond to events that occur within the network.

As networks grow in terms of size, complexity, and number of components associated with the network, the amount of data that is created, received, and stored during monitoring of the network also grows in size and complexity. As the amount of data increases, it may also become more difficult for administrators of the network to consume or analyze the data to effectively manage the operations of the network in response to the received data. Searching through received network data for particular operational information may be both time and resource consuming such that important information or data concerning the operation of the network may be missed by the administrators, putting the efficiency of the network at risk.

It is with these observations in mind, among others, that various aspects of the present disclosure were conceived and developed.

SUMMARY

One implementation of the present disclosure may take the form of a method for managing a network of computing devices. The method may include the operations of receiving, through a user interface, a plurality of data layer parameters comprising identifications of network operation information and a start time for obtaining the network operation information, collecting, at a collector component of a network management system, a raw data network information feed comprising machine sourced information from one or more devices of the network of computing devices and human sourced information from the one or more third party systems in communication with the network management system, and correlating a portion of the raw data network information feed with the identifications of network operation information and the start time of the received plurality of data layer parameters. The method may also include storing the portion of the raw data network information feed as a layer of network data in a storage device, receiving a search query from a user of the network management system through the user interface, the search query comprising an indication of an aspect of the raw data network information stored as the layer of network data in the storage device, accessing the layer of network data in the storage device based on the received search query to obtain a portion of the layer of network data corresponding to the search query, and providing the portion of the layer of network data corresponding to the search query to the user of the network management system.

Another implementation of the present disclosure may take the form of a system for managing a computer network. The system may include the components of a communication port for communication with one or more devices of the computer network and one or more third party systems, a collector component receiving a raw data network information feed comprising machine sourced information from the one or more devices of the computer network and human sourced information from the one or more third party systems, and a database storing the raw data network information feed in a first number of network event blocks. Further, a computing device may be included that executes a user interface application and also receives, through the user interface, a plurality of data layer parameters comprising identifications of network operation information and a start time for obtaining the network operation information, correlates a portion of the raw data network information feed with the identifications of network operation information and the start time of the received plurality of data layer parameters into a layer of network data, and receives a search query from a user of the computing device, the search query comprising an indication of an aspect of the layer of network data. The computing device may also access the layer of network data based on the received search query to obtain a portion of the layer of network data corresponding to the search query and provide the portion of the layer of network data corresponding to the search query to the user of the network management system through the user interface.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters may refer to the same parts throughout the different views. The drawings depict only typical embodiments of the present disclosure and, therefore, are not to be considered limiting in scope.

DETAILED DESCRIPTION

Figure 1:
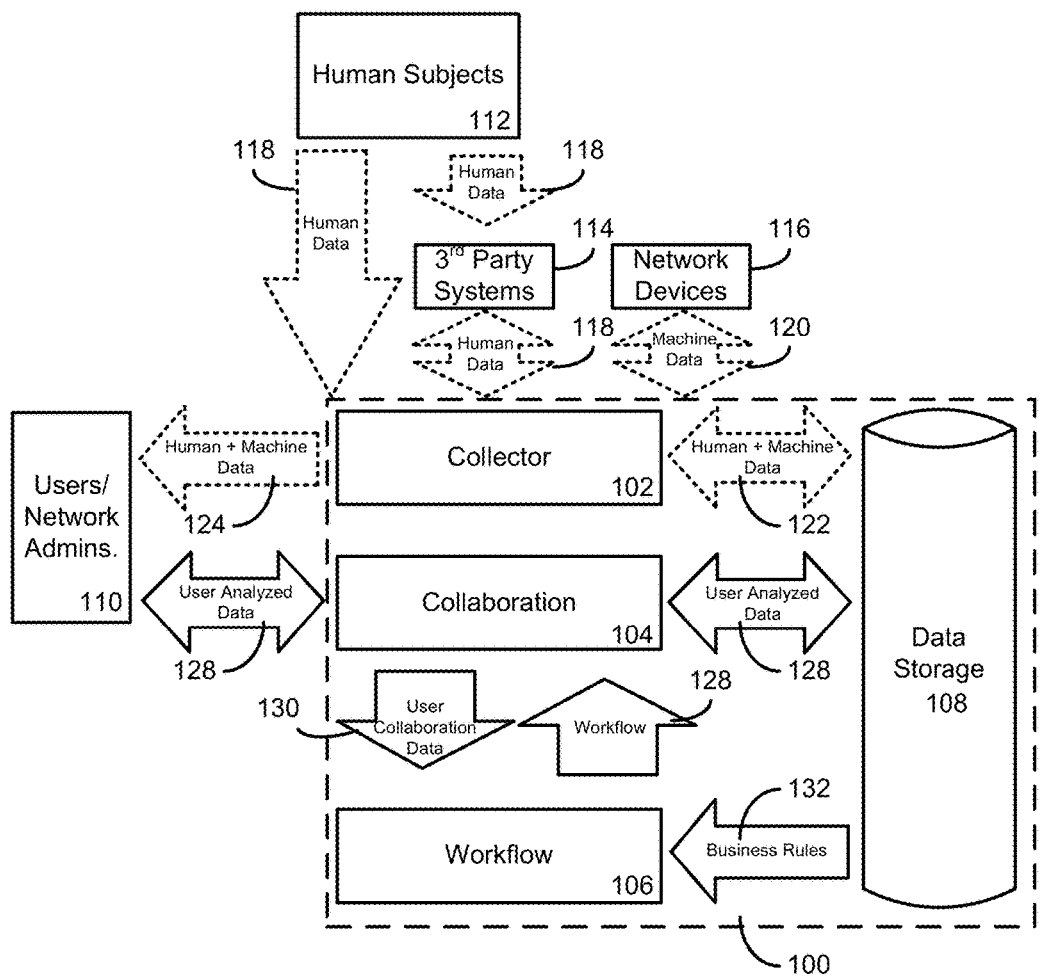
FIG. 1 is an example network environment for combining machine-sourced and human-sourced network information for storage and analysis by a network administrator device.

Aspects of the present disclosure involve systems and methods for summarizing large amounts of data over time into one or more data layers. In particular, the systems and methods provide for transforming data using one or more operations including, but not limited to, copying, summarizing, correlating, translation to other computer or human readable forms, linking to other data sources, machine, or human responses and the like based on the raw data from a large data feed into one or more layers that are defined by layer parameters. For example, a large raw data feed may include combined machine-sourced and human-sourced network information associated with the operation of a network of computing devices. This raw data feed is provided to a collecting system and stored in a database for analysis by one or more network monitoring systems or administrators. However, searching through this large amount of data may be both time and resource consuming. As such, the described systems may provide for the parsing or separating of portions of the raw data feed into one or more data layers. The data layers reduce the burden on the network or other resources to locate and identified particular data within the raw data feed, thereby improving the operation and monitoring of the network.

In one particular embodiment, the parameters of a data layer are provided to the system through a user interface. Thus, a customer or user of the interface may provide various parameters that define the portion or portions of the raw data feed to be included in the layer. With the received parameters, the system may analyze the raw data feed as it is received at the monitoring or collecting system to identify instances of data that match the received parameters. The matching data may then be stored in a database as part of one or more data layers. In one embodiment, the data itself is stored in the data layer database. In another embodiment, a copy of the data is stored in the data layer database. Access to and control of the data layer information may then be provided to a user through the user interface, including presenting the data in a readable format, an interface to receive a start time to begin storing the data and/or a stop time to cease storing the data, downloading of the data to an external device, and the like.

In still another implementation, the data of the data layer may be provided to a third party or external service for analysis as the data is received from the raw data feed. The information received from the external service may also be received at the layer database and stored in the data layer with the matching data from the raw data feed. Further, the data of the data layer may be transformed in any manner to improve the presentation or consumability of the data to a user of the user interface. Through the systems and methods provided herein, data from a large raw data feed may be parsed or searched and made available to a network administrator for easier management of the network without consuming vast network resources and administrator time.

FIG. 1 is an example network environment for combining machine-sourced and human-sourced network information or data into a raw data feed that may be stored in a database in one or more data layers. The environment includes a system 100 for collecting and storing information concerning a network of interconnected computing devices. Such information may include machine sourced information 120 (such as alerts and/or logs provided by the devices in the network) and/or human sourced information 118 (such as emails, instant messages (IMs), documents, transcripts, and the like). Further and as explained in more detail below, the system 100 may store subsets or portions of the combined machine sourced information and the human sourced information into one or more data layers for use by a user of the system 100. Although illustrated in FIG. 1, the system 100 may include certain components and sub-systems that are not shown. Also, it should be appreciated that any subsystem may include any number and type of sub-components for performing the functions of the components. More components may also be included in the system 100, although not specifically illustrated in FIG. 1. As described in more detail below, the system 100 may be embodied on or otherwise include a computing system for performing the operations discussed herein.

As mentioned, the system 100 provides for the collection and storing of data and/or other information concerning a computing network. To facilitate this feature, the system 100 includes a collector component 102. In general, the collector 102 receives information concerning one or more of the devices of the network, collects or otherwise correlates the received data through the use of tags, and stores the data in a shared database 108. As such, the collector 102 of the system 100 is in communication with one or more devices 116 of the network, one or more sources of human sourced data 118, and the database 108 for storing the information. As shown in FIG. 1, the devices of the network (illustrated as the monitored devices 116) provide information 120 or machine data to the collector 102. The information or data 120 provided by the monitored network devices 116 may be any output from the device. Such information 120 may be transmitted to the collector 102 in response to a query from the collector or in response to any event occurring on the network. The data 120 may be syslogs, packet capture, threat reputation, security events, performance statistics, environmental measurements, mechanical failure alerts, and the like. In other embodiments, the data 120 may be provided by an application server of the network. In still other embodiments, the network may include any number of sensor devices such that the machine data 120 may be files from remote sensors. For other network types, the machine data 120 may include transaction records and/or audit logs from a medical Electronic Medical Records (EMR) system, an Enterprise Resource Planning (ERP) system, a Human Resource (HR) system and/or a Customer Relationship Manager (CRM) system.

In addition to the data from one or more devices 116 in a network, the collector 102 may receive human sourced data from one or more administrators or other users of the network. As illustrated in FIG. 1, one or more human subjects 112 provide human sourced data 118 to the collector 102. Such information may be provided directly to the collector 102 through one or more interfaces to the system 100, or may be provided to the collector through one or more third party systems 114. For example, the human sourced data 118 may be an email provided to the system from a user 112 through an email program 114, online or shared social media services, applications that source information from user's emails, chats, document management systems, ratings, surveys, health and medical devices, and the like. In general, the human sourced information 118 may be any data or information provided to the system 100 by a user 112. Such human sourced information 118 may include, but is not limited to: bug, issue or ticket tracking, contact management, customer databases, email, documents, spreadsheets, presentations, transcripts, wikis, blogs, social media platforms, payment platforms, mobile devices, security sensor devices, video or still cameras, microphones, scales, implanted medical devices, GPS trackers, wearable biometric monitors, identification devices. Such information may be directly provided through third party systems 114 using the GUI or CLI of the system and may be directly associated with the machine data 120. Other human sourced information 118 may be indirectly provided to the system 100, including command history and time, query history, problem resolution speed, use of system features (bookmarks, tags, etc.), collaboration usage (session participation and following), and the like.

As mentioned above, the information received at the collector 102 of the system 100 may be stored in a database 108. Thus, the collector 102 may transmit the received information concerning the network 122 to the database 108 for storage. Such information 124 may also be provided to a user 110 of the system 100, as explained in more detail below. To combine the machine sourced data 120 and the human sourced data 118 into the stored data 122, the system 100 (and in one particular embodiment, the collector 102) may sort the information and attach or otherwise associate one or more identifiers to the received data. Such identifiers may aid the system 100 in storing related information together and retrieving related information from the database 108 in response to a search query provided to the system from a user 110.

As explained above, the amount of data included in the combined machine-sourced and human-sourced information (referred to herein as the "raw data feed") may be quite large (such as terabytes or exabytes of information). Such large amounts of data may make searching through the tags associated with the raw data feed for particular types of data both time and resource consuming. In other words, retrieving particular information of a particular component of the network (such as user access requests of a particular application server of the network) may take a long time to receive the results and may consume a large amount of component resources to locate the corresponding data within the stored data. Thus, the system 100 may also include components, methods, or systems that allow for storing or copying of particular portions of the raw data feed into one or more data layers for easy searching and viewing by a user of the system. These data layers contain data from the raw data feed received at the system 100 that is defined by parameters provided to the system by a user. In one particular embodiment, portions of the database 108 may include mechanisms and operations to perform the methods described herein. Further, the data layers of the system for storing data related to the raw data feed may be a part of the database 108 or may be stored separately in another storage device. Through the data layers, a user may simply access the data layer to retrieve the desired network information, removing the need to search through the entire stored data for the appropriate tags.

Figure 2:
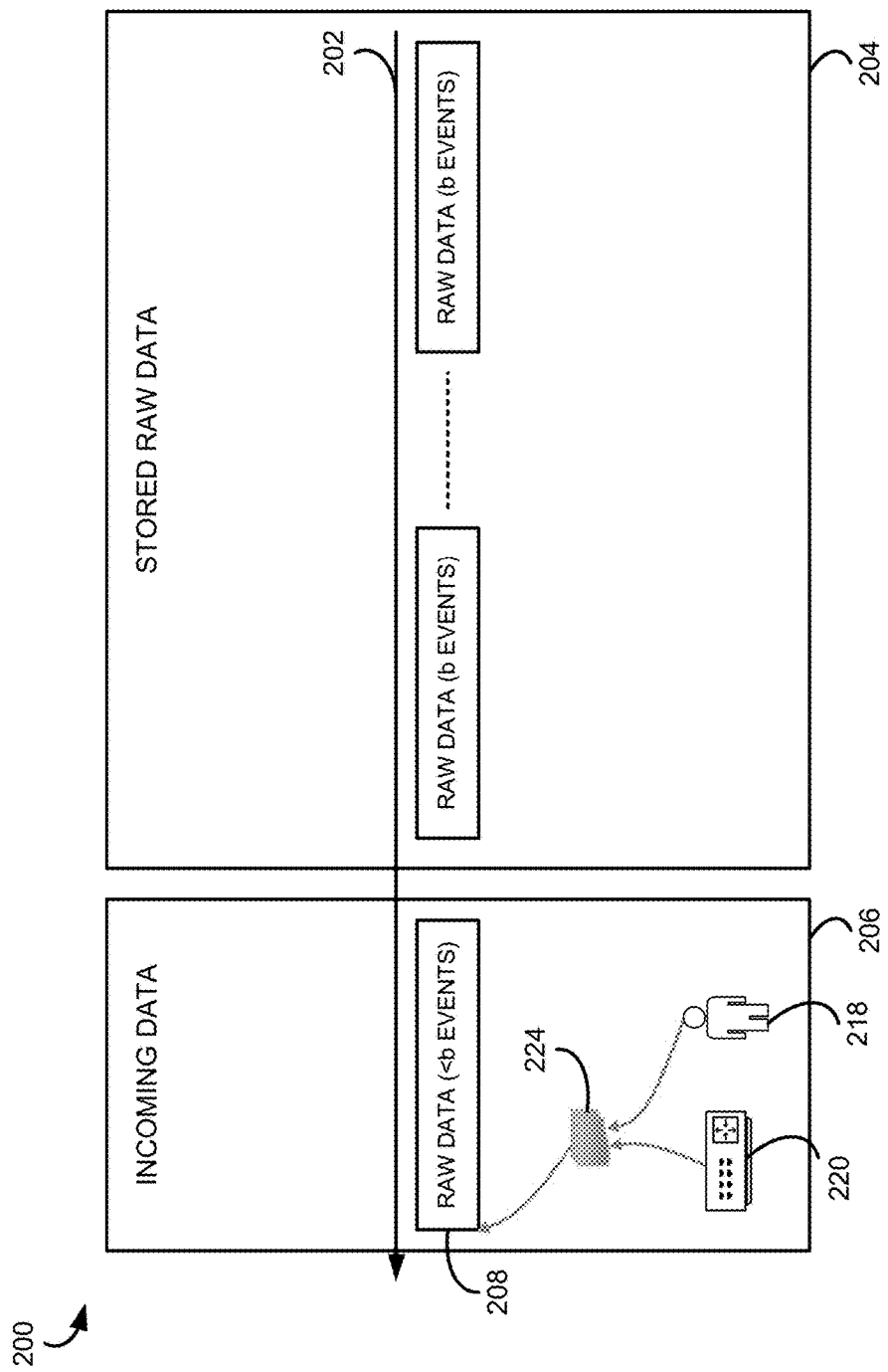
FIG. 2 is a diagram illustrating receiving and storing combined machine-sourced and human-sourced network information for network administration and management.

FIG. 2 is a diagram 200 illustrating receiving and storing combined machine-sourced 220 and human-sourced 218 network information for network administration and management. As shown, machine-sourced information or data 220 and human-sourced information or data 218 associated with an operating network are combined into "events" 224 through the system 100 described above with relation to FIG. 1. The events 224 are provided to a database of system 100 in a raw data feed 208 of network information and data. The diagram 200 provides an illustration of the raw data feed 208 along a timeline, illustrated as line 202 in FIG. 2. Events received in the past are located on the right-side of the timeline 202, illustrated in FIG. 2 as occurring during the "stored raw data" section 204 of the diagram 200. Events received at present time are located on the left-side of the timeline 202, illustrated in FIG. 2 as occurring during the "incoming data" section 206 of the diagram 200. Events 208 received during the incoming data section 208 may not yet be stored by the system 100 but may instead be arriving from the various data sources of the network. In one embodiment, events 224 may be clustered into raw data blocks that include any number of events, such as b events per cluster or "block" as shown in the diagram 200. Thus, the raw data feed 208 may receive entire raw data blocks in the incoming data section 206 that may be searched, parsed, or otherwise analyzed before being stored in the stored raw data section 204. During the incoming phase, portions of the raw data feed 208 or incoming raw data block may be obtained or copied for inclusion in a data layer, as explained in more detail below.

In general, a data layer is a business-need driven transformation of the raw data into a more concise and actionable form. The data layers may contain transformation generated events 224 from the raw data stream 208 or copied events from the raw data stream. Further, one or more layers may be generated from a single raw data stream 208 or from several data streams. In general, data layers are stored in data blocks of a size typically less than data blocks of the raw data stream 208. Further, a data layer may be defined for a given range of time for collecting data from the raw data feed, such as all raw data that matches the data layer parameters between a starting date and a stopping date of the raw data feed. The creation and operation of the data layers are described in more detail below.

Figure 3:
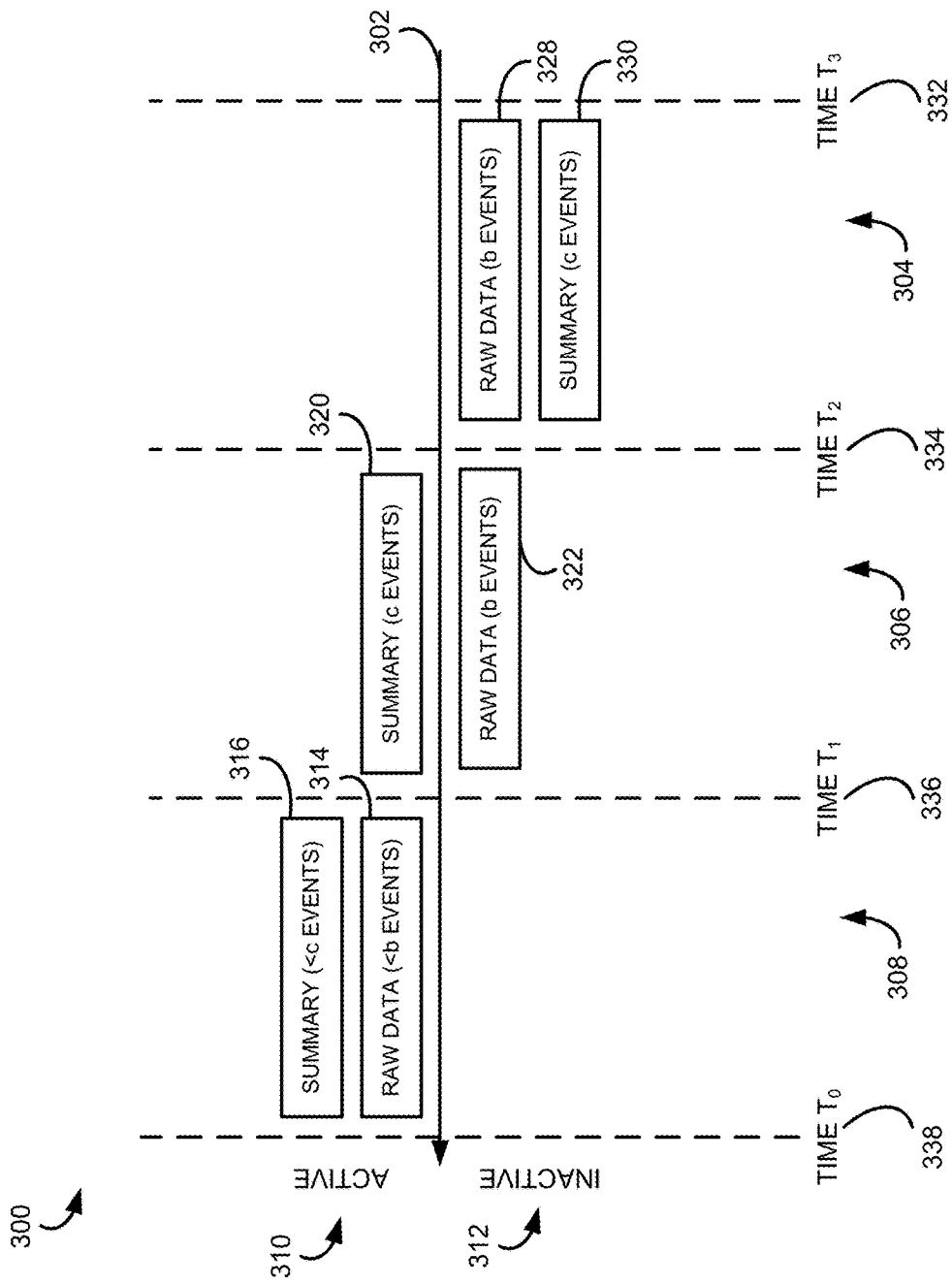
FIG. 3 is a diagram illustrating a first example of data layering of received network data along a timeline.

FIG. 3 is a diagram 300 illustrating a first example of data layering of received network data along a timeline 302. The diagram 300 of FIG. 3 is similar to the timeline diagram 300 of FIG. 2 discussed above. Thus, data layers that are created or received in the past are located on the right-side of the timeline 302 while data layers created or received at a present time are located nearer the left-side of the timeline 302. In particular, the timeline diagram 300 of FIG. 3 is divided into three sections 304-308. In addition, the diagram 300 includes an upper portion 310 for "active" data blocks and a lower portion 312 for "inactive" data blocks. Active 310 data blocks are layers available to a user of the system 100 to search and/or modify. Inactive 312 data blocks are layers are not available or visible to a user and thereby consume far less computing resources of the collector system 100. In one embodiment, the status of active or inactive applied to a layer is based on layer parameters provided to the system 100, as explained in more detail below.

In the diagram 300 of FIG. 3, incoming raw data (box 314) is illustrated between time $t_0$ 338 and time $t_1$ 336 (also referred to as segment 308 of the timeline 302). As further shown, the size of the raw data block 314 is less than b as the raw data feed will be collected until the data block of size b is created and stored, beginning at time $t_1$ 336. Between $t_0$ 338 and $t_1$ 336 (also referred to as segment 308 of the timeline 302), the raw data block 314 may be available to a user of the system to search or otherwise analyze the raw data information. For raw data blocks 322, 328 received before $t_1$ 336 (also referred to as segments 306 and 304 of the timeline 302), the raw data is not available for searching or is otherwise inactive to free up those resources for other searches of the received human and machine data stored in created layers of the system 100.

In addition to the raw data layers or blocks, a user of the collection system 100 may define and/or create one or more other data layers of information for collection of a particular set of network data for easy access by the user or a user system. As explained in more detail below, the information included in the data layers may be a segment of the raw data feed and/or other information or data related to the network derived from the raw data feed information. Further, the data layers may be defined through one or more parameters, such as the type of data to be included in the layers (either segments of the raw data feed or copies of segments of the raw data feed), a start and stop time or day for collecting information into the layers, and one or more external sources of information or data to include in the layers. The parameters for the data layers may be provided, in one particular embodiment, through a user interface of the collecting system 100 that defines the data layer.

As shown in the diagram 300, data layers other than the raw data feed (illustrated in blocks in FIG. 3) may be labeled as a summary 316 of network data. However, it should be appreciated that the label assigned to the data layer may be any moniker. Typically, the data layers other than the raw data blocks 314 are of a smaller size, such as size c which is less than size b of the raw data blocks. Further, the parameters associated with the data layers 316 may define for how long upon receipt of the data or the creation of the data block the data layer is available to search by a user of the collecting system 100. For example, the summary data layer 316 received during timeline segment 308 may be defined as active or otherwise searchable by a user's search query provided through the collection system 100. Similar to the raw data block 314, the summary data layer 316 in this segment 308 is less than size c as the block may not be full to provide to storage. In segment 306 of the timeline 302, however, a full summary block 320 of size c may be active for search queries by the collecting system 100. Similar to the raw data feed, stored summary data blocks 330 received before $t_2$ 334 (in segment 304 of the timeline 302) may no longer be available for searching or is otherwise inactive to free up those resources for other data sources. As such, in this example the data layer parameters for the summary data layer 320 may identify or define the storage of the summary data from time $t_0$ 338 to time $t_2$ 334, with data layer blocks 330 created before that time being discarded from the storage or otherwise unavailable for search queries.

As shown in diagram 300, all of the blocks of the layers (such as summary block 320 and summary block 330) are time aligned to the beginning and end times of the segments 304-308 of the timeline 302. In one instance, the beginning and end times for the segments 304-308 correspond to the raw data block size of b events. For example, segment 306 of timeline 302 (between $t_1$ 336 and $t_2$ 334) may be related to the time to receive b events in the raw data feed. In other words, size b events is the largest amount of data that the underlying database can read/write in an efficient manner. Although summary layer data block 320 includes fewer overall events (c events<b events), the layer data block is aligned within the same segment 306 of the timeline 302 as raw data block 322. Thus, raw data block size b dictates the beginning and end times for the segments 304-308 of the timeline 302. This enables a subset of the total data (i.e., the data stored in summary layer 320) to be active within a given time range for a particular layer. Leveraging this time aligned storage characteristic of the system 100, user searches and other activities can be further narrowed down to just the blocks meeting the provided parameters. This makes the overall system 100 responsive with minimal resource use in addition to enabling users to organize vast amounts of data.

As should be appreciated, the creation and availability of the summary data layers 316, 320 are more useful to a user of the collection system 100 for obtaining and consuming network information provided in the raw data feed. In particular, because the data has been summarized according to a business need and is stored in a volume that is smaller in size than the raw data blocks, searching or obtaining the network data and information included in the summary data layer is both faster and consumes fewer system resources. The extraction or copying of information from the raw data feed that satisfies a business need of a user of the collection system 100 and storing the information for a defined period of time therefore improves the efficiency of the system and the use of the system by the user.

Figure 4:
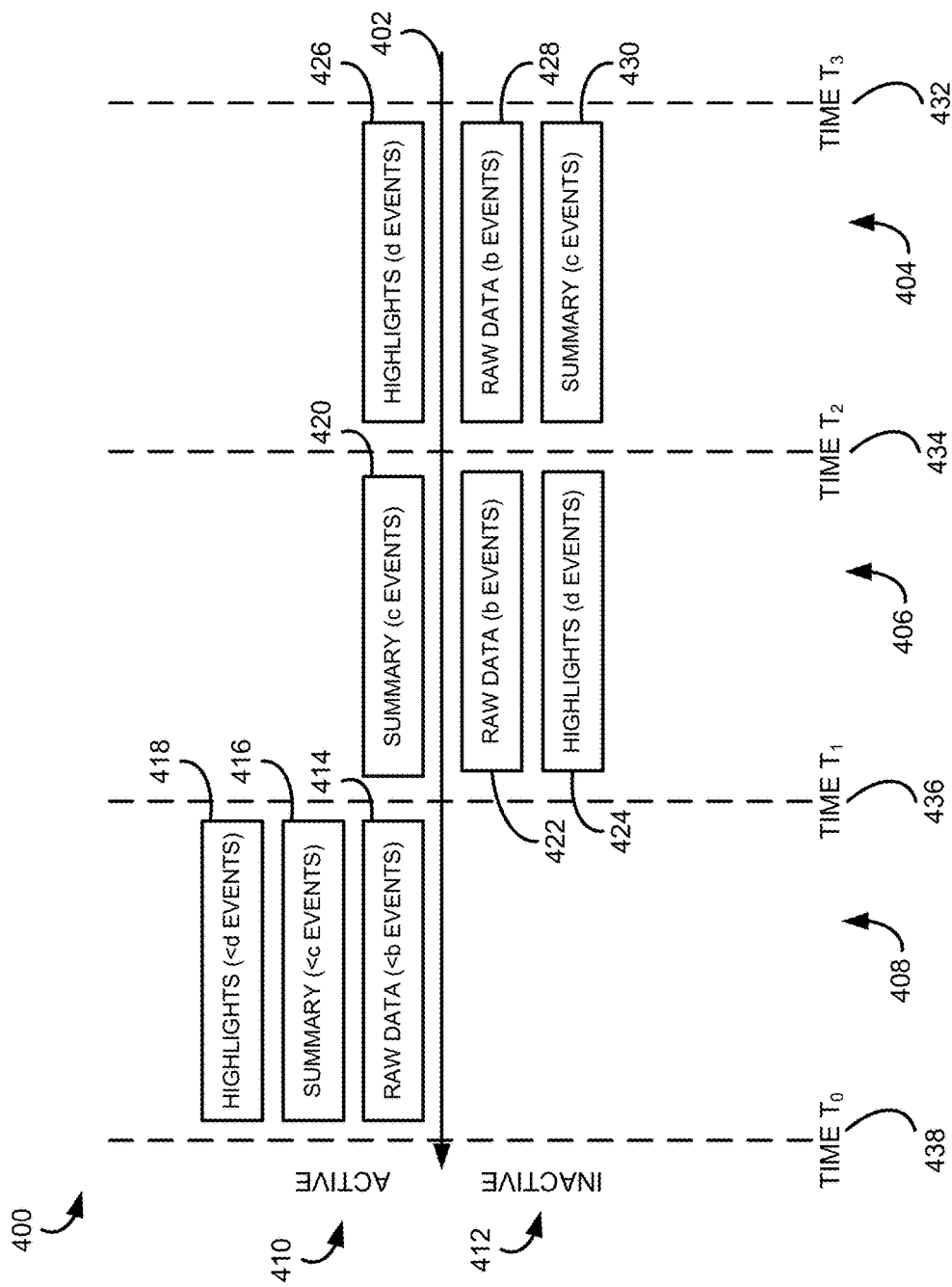
FIG. 4 is a diagram illustrating a second example of data layering of received network data along a timeline.

As mentioned above, any number of data layers of varying parameters may be created and implemented within the collection system 100. For example, FIG. 4 is a diagram 400 illustrating a second example of data layering of received network data along a timeline 402. The timeline 402 of the diagram 400 is similar to the timeline of FIG. 3, including a first segment 408 between time $t_0$ 438 and time $t_1$ 436 for arriving network data, a second segment 406 between time $t_1$ and time $t_2$ 434 for recently stored data, and a third segment 404 between time $t_2$ and time $t_3$ 432 for more distantly in time stored data. Further, in addition to the raw data blocks 414, 422, 428 and the summary data layer blocks 416, 420, 430 described above, a highlight data layer block 418 is also created and stored within the collection system 100. The parameters for the highlight data layer 418 may be such that the data or information stored in or associated with the highlight data layer may be less than the summary data layer, so that size d is less than size c. In addition, the parameters may further define when the highlight data layer is available or active for searching by a user of the collection system 100. In the particular embodiment illustrated, the information in the highlight layer 418 is available or active during segment 408, inactive during segment 406, and active in segment 404.

In this configuration, all network data (whether from the raw data feed 414, summary data layer 416, or highlight data layer 418) received in segment 408 may be available for searching or viewing through the user interface of the system 100. Only the summary data layer 420 information may be available for searching in segment 406 and only the highlight data layer 426 information may be available for searching in segment 404. This configuration may be utilized or defined by a user through the parameters associated with each data layer. Through the configuration, highlight 426 information may be available during a search query for older data (segment 404), summary 420 information may be available for newer data (segment 406), and all data 414-418 is available for currently receiving data (segment 408). Again, the beginning and end times that define the segments 404-408 of the timeline 402 may be based on the size of raw data blocks 422, 428 of b events. As such, the system 100 resources are not consumed from making available and searching through all of the raw data feed while still providing relevant or desired network information defined by the user of the system in the smaller data layers of the system. The diagram 400 of FIG. 4 is but one example of a data layer configuration of the system 100 and any configuration of the parameters of the data layers is contemplated.

Figure 5:
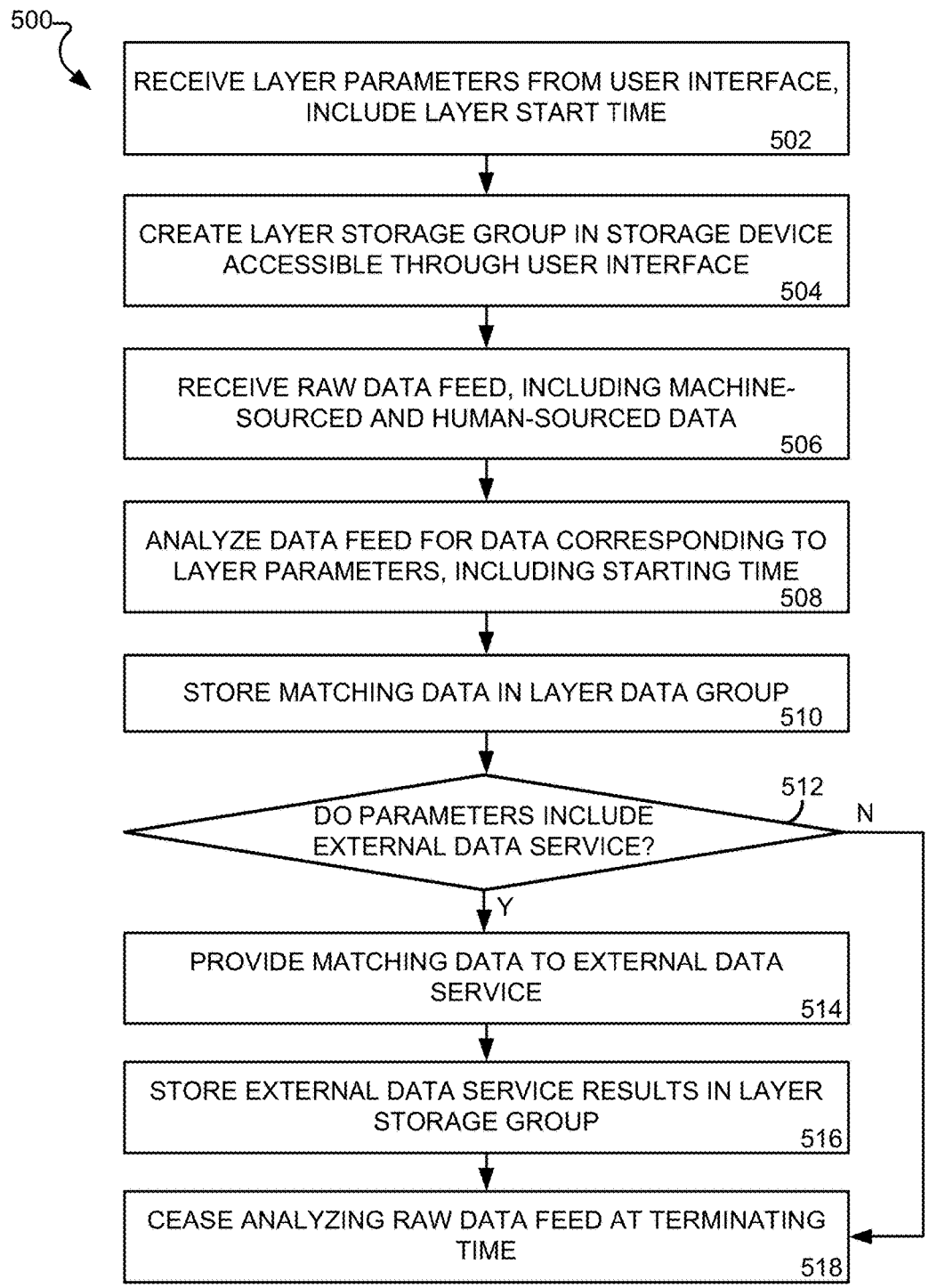
FIG. 5 is a flowchart of a method for receiving and storing machine-sourced and human-sourced network information in one or more data layers for presentation to a user of a network management user interface.

Turning now to FIG. 5, a flowchart of a method 500 for receiving and storing machine-sourced and human-sourced network information in one or more data layers for presentation to a user of a network management user interface is shown. In one embodiment, the operations of the method 500 are performed by the system 100 of FIG. 1, and in particular the collector 102 of the system. In general, however, the operations of the method 500 may be performed by any computing device associated with or otherwise receiving the raw data feed from the network, including both machine and human data.

Beginning in operation 502, the system 100 receives one or more parameters that define a data layer for collecting information or data related to a monitored network. For example, the parameters for a particular data layer may include information related to accessing a network device, such as user access requests and denies, log-in information, and the applications accessed by users of the device. In another example, the information defined by the data layer parameters may include Internet Protocol (IP) addresses, Media Access Control (MAC) addresses, and the like of devices requesting access to a network device. This information may be provided from the network device within the raw data feed to the collector 102 of the system 100. Other types of raw data feed may also be defined through the data layer parameter, such as one or more sources of human-sourced data related to a particular network device or network function. Also included in the data layer parameter information may be a timeframe (such as a start date and an end date) for which the identified data or data sources is included in the data layer. In general, any information that defines the type, size, and date received of the raw data feed may be included as a parameter of a particular data layer.

In yet another embodiment, the parameter for the data layer may include an identification of one or more external sources of information related to the network. In one particular example, the system 100 may provide an IP address identified as attempting to access a network device to a third party or external reputation system. In general, a reputation system identifies potentially malicious IP addresses from which attacks on network devices have been previously launched. Thus, the system 100 may provide identified or extracted IP addresses to the reputation system and receive a report back that categorizes the provided IP addresses as a potential danger or a safe address. This report received from the reputation system may be defined by the data layer parameter and provided within the layer along with other network information received from the raw data feed. In another example, the external source may be a scheduling program that provides schedules of maintenance of one or more network devices for inclusion in the data layer information as defined by the data layer parameter. In general, the external source of information may be any source providing network-related information upon a request from the network monitoring system 100 that may be included in a data layer along with information from or copied from the raw data feed of network information.

In one particular embodiment, a user of the system 100 accesses a user interface to provide the data layer parameters that defines the information to be included in the data layer. Thus, the parameters may relate to a business need of the user, such as a network administrator tasked with monitoring the operation of the network devices. As such, the information included in the data layer as defined by the provided parameters may aid the network administrator with the monitoring the operation of the network. In this manner, the user may tailor the particular data layers to include as much or as little network information as desired in response to a business need of the user. Further, multiple data layers may be created by the user to further tailor to the user's business needs, with some data layers included more or less data (as defined by the data layer parameters) then other data layers.

In operation 504, the system 100 may create one or more storage spaces within a storage device or storage system for the data layers created through the received parameters. In one particular embodiment, the data layer storage spaces may be available for searching or otherwise accessible through a user interface of the system 100. As mentioned above, the data layers are typically smaller in size than the raw data feed blocks such that storing a block of data layer information takes up less size in a storage system than the raw data feed storage. In operation 506, the system 100 may begin (or continue) receiving the raw data feed from the network devices, human-sources, and/or third party or external information sources. In operation 508, the system 100 analyzes the incoming raw data feed to identify data that matches or corresponds to the parameters of the data layers received through the user interface, including the start time or day for the defined data layers. For example, the raw data feed may include IP addresses of computing devices that request access to a particular network device. The IP addresses may then be identified by the system 100 (through an analysis of the incoming raw data feed) as being from the particular network device and including an IP address of a requesting computing device to access the network device. In another example, the raw data feed may include an email sent from a network administrator concerning the particular network device discussing requests to access the device. If the parameters for the data layer include the human-source information, the email may also be included in the data layer, as described in more detail below.

In operation 510, the system 100 may store the identified network information from the raw data feed of information into the storage space for the associated data layer. For example, a particular portion of the raw data feed may match the data layer parameters received through the user interface. The identified network information may then be stored in the corresponding layer, such as a summary layer or highlights layer. Similar information as defined by the parameters associated with the layer may thus be stored together or otherwise associated as a block of data for that particular layer. Further, in one embodiment, the portion of the raw data feed that matches the layer parameters may be stored as the layer block. In other embodiments, a copy of the raw data that matches the layer parameters may be stored as the layer block. Although discussed herein as being stored as a layer block, it should be appreciated that the data of the layer may be stored in one or more storage media in any fashion and that the data belonging to a block of data is merely a convention to describe a relation between the stored data. As stored, the data may be located in any address within the storage medium.

In operation 512, the system 100 may determine if the parameters that define the layer include one or more external data sources. For example, the parameter may include a third party analysis of the data, such as an IP address reputation system to identify potential malicious source IP addresses for attacks on the network. If the layer parameters do not include third party or external data services, the method 500 continues onto operation 518 described in more detail below. However, if the layer parameters include third party provided data or external data services, the method 500 continues to operation 514 where the system 100 transmits or otherwise provides at least a portion of the identified network information matching the layer parameters to the external data service. Continuing the above example, the system 100 may provide IP addresses included in the layer data to the reputation service. In response, the external data service may return additional data related to the layer data, such as results or reports of an analysis of the data provided to the external data service. The returned data or information may be stored in the storage device or medium along with the rest of the data layer information from the raw data feed in operation 516. In this manner, external data related to data of the layer obtained from the raw data feed may be obtained and stored along with the raw data and made available through the layer. This external data may be received from any external system or service related to the operation of the network.

In operation 518, the system 100 may cease analyzing the raw data feed to gather or obtain raw data (and external data) for inclusion in the data layer. In one particular embodiment, the system 100 may cease collecting data for the layer corresponding to a stop time or date provided as a data layer parameter through the user interface. In this manner, a user of the system 100 may define when the system 100 halts data collection for a particular layer. In another example, the system 100 may limit the size of the data layer block and cease raw data feed analysis and collection when that data layer block size limit has been reached. Regardless, the system 100 may utilize the method 500 of FIG. 5 to create and store one or more data layers from a large raw data feed from a network for searching, analysis, and consuming by a network operator or administrator. These data layer blocks of data may be obtainable and/or searchable by the network operator for any length of time defined by the parameters of the data layer.

Figure 6:
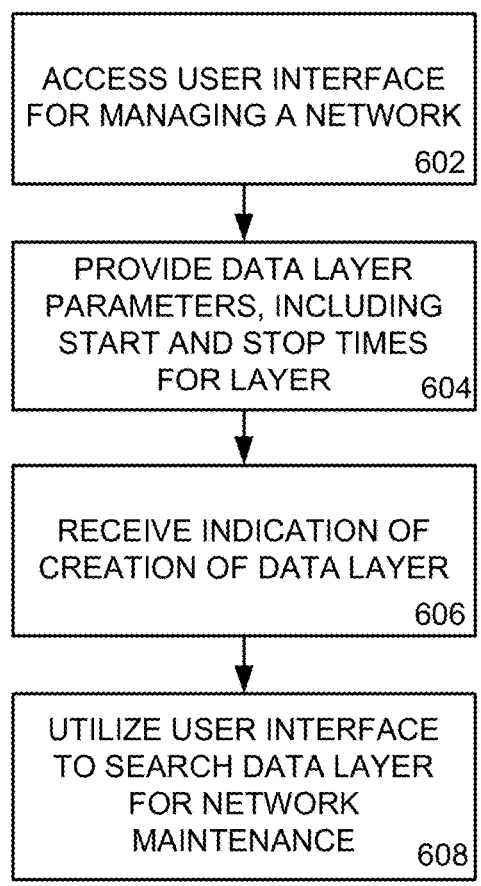
FIG. 6 is a flowchart of a method for utilizing a user interface to provide data layer parameters that define data types to be included in a data layer of machine-sourced and human-sourced network information.

FIG. 6 is a flowchart of a method 600 for utilizing a user interface to provide data layer parameters that define data types to be included in a data layer of machine-sourced and human-sourced network information. The operations of the method 600 may be performed by a network administration system or center to access system 100 that collects machine-sourced and human-sourced information of a network and provides such information to the system for storage. This raw data feed of network information may be parsed based on the provided parameters and stored as a data layer for use by the network administration system to quickly access relevant network information while decreasing the performance cost on the system components.

Beginning in operation 602, the network administration system accesses the user interface to define the layer data parameters based on a business need of the network administrator. For example, a network administration system may monitor the access requests received at a particular application server of the network to determine the source IP addresses of devices requesting access and the services or use of the application server from those devices. Thus, the network administration system may access the user interface of system 100 and provide one or more parameters that define the desired network information or data in operation 604. In one particular example, the network administration system provides a network address that is associated with or otherwise used to identify and access the application server of the network. Other parameters may also be included, such as an identification of a particular type of report provided by the application server to the data collection system 100. For example, the application server may periodically provide an operating status report to the collection system 100 that includes requests for access to the application server, as well as an indication of the type of request. This network data may be included in the raw data feed of network information being transmitted to the data collection system 100. In addition, the parameters provided through the user interface by the network administration system may include an identification of this operating status report as data to be included in a data layer. In still other examples, the parameters may include any IP address reported or provided by the application server of the network in any manner for inclusion in the data layer.

As described above, the collection system 100 utilizes the data layer parameters to obtain or copy network data from the raw data feed. In other words, the collection system 100 applies the received business-need parameters to the incoming raw data feed to obtain data that matches the parameters. For example, the collection system 100 may search the raw data feed for data that includes an identification of the application server of the network and takes the form of an IP address to include the information in the data layer. As mentioned above, the obtained data from the raw data feed may include both machine-sourced and human-sourced network information. Thus, one or more emails may also be analyzed and stored if such information matches the parameters of the data layer provided through the user interface. Further, in some instances the collection system 100 may store data layer information in particular block sizes to improve the efficiency of the collection system.

In another example, the data layer parameters may include a start time/date and end time/date for data to be included in the particular layer. In this manner, the network administration system may define a range of time from which particular network data may be included in the data layer. Different data layers of the system 100 may have different time to live ranges. In another example, the collection system 100 may provide an expiration time or date for any created data layer to ensure that consumption of the data storage media of the system is not overloaded.

Once the one or more data layers are created, the collection system 100 may provide an indication of an available data layer to the network administration system in operation 606. In one particular example, the collection system 100 provides the indication of the available data layer to the network administration system through the user interface. In operation 608, the network administration system may then utilize the user interface to search the information or data included in the one or more data layers defined by the network administration system. The network administration system may utilize such business-driven information to configure, monitor, or otherwise control the network or network devices providing information in the raw data feed. Further, because the information stored in the data layers is stored in small blocks of data than the raw data feed, the parsing and searching of the information in the data layer may occur without significant taxing of the collection system 100 resources, providing the results of such searching faster and more efficiently.

Figure 7:
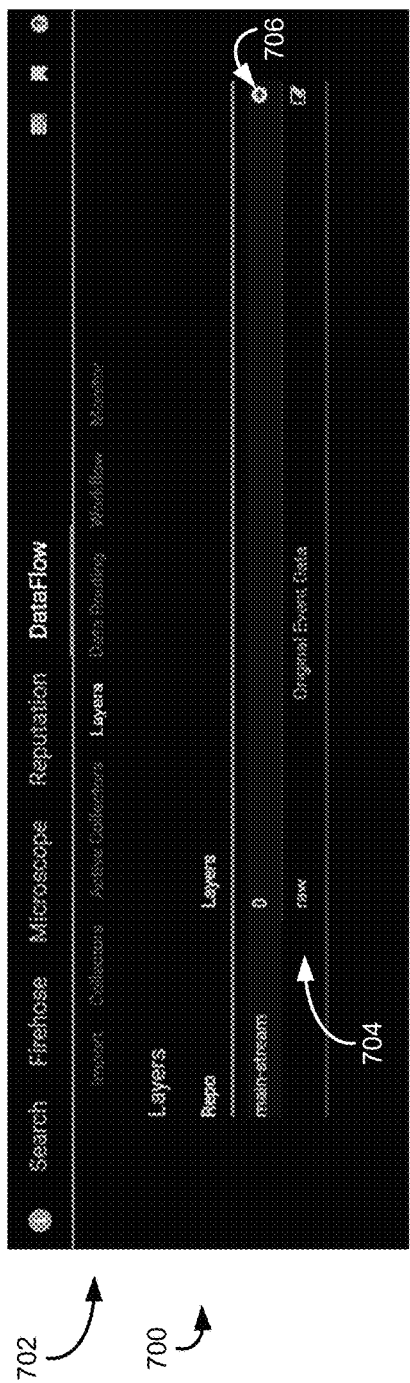
FIG. 7 is an example user interface for creating a data layer for viewing machine-sourced and human-sourced network information of a network.

As mentioned above, the collection system 100 may include a user interface through which a network administration system may access information or data concerning the network. Although the user interface may take any form that provides for interacting with network data and information, the user interface may include fields or other portions that allow the network administration system to provide information to the collection system 100. For example, FIG. 7 is an example first user interface 700 for creating a data layer for viewing machine-sourced and human-sourced network information of a network. Through the user interface 700 a network administrator (such as a network engineer or a monitoring system) may create the one or more data layers of network information discussed above. The user interface 700 may, in some instances, be accessed through a computing device in communication with the collection system 100, such as a terminal to the system. Through the user interface 700, a network administrator may configure aspects of the network and/or obtain information collected about the network. Adding and editing data layers of raw network data is but one aspect of network management that may be accomplished through the user interface 700.

As shown in FIG. 7, the user interface 700 includes several network information control features, illustrated as links across the top of the interface labeled "Search" (for searching for particular network information, "Reputation" (for applying a reputation service for IP addresses associated with the network), and the like. For a particular service known as "Dataflow", the user interface 700 provides mechanisms for managing the flow of network information or data received at the collection system 100. Through a second-level menu 702, a network administrator may select to create or manage one or more data layers of business-need driven network data. In one particular instance, creating and/or modifying data layers requires administration rights obtained through the user interface 700. Thus, a network administrator would log into the user interface 700 to gain data layer modification rights, although the information stored in the data layers created by the network administrator may be both viewable and searchable by other users of the interface. In particular, data received about a network (referred to above as the network raw data feed) may be stored by the collection system 100 in a repository. This repository may be further divided into other groups of data. For example, as shown in the user interface 700, network data repository may include a "main-stream" repository 704 of all network data received from the network collected by the collection system 100. As also illustrated in the user interface 700, the main-stream data 704 includes no currently defined layers. This main-stream repository may be accessible by any number of network administrators as defined by the collection system 100, although only a select few may alter or create a layer, as described below.

Figure 8:
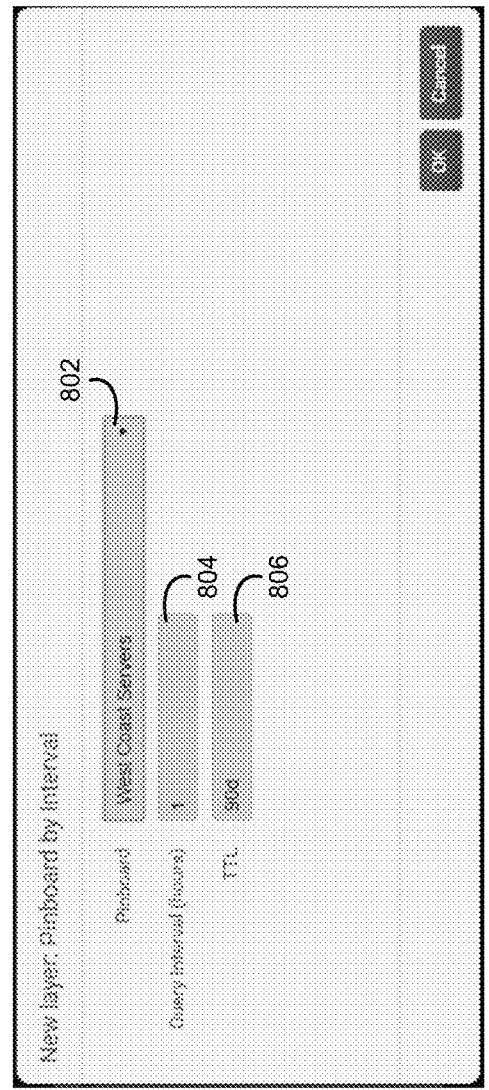
FIG. 8 is an example user interface for editing parameters for a data layer for viewing machine-sourced and human-sourced network information of a network.

To add a new layer to the repository, a network administrator may select (through an input device to a computing device accessing the user interface 700) the plus button on the right-side of the interface. A similar approach may be utilized to edit one or more layers that are previously created. A pop-up menu (not shown) from the user interface 700 may allow the network administrator to provide a layer name and a description of the network data to be included in the data layer as defined by the administrator. In general, any name and description may be provided for a particular data layer. Additional pop-up menus (or any other type of interactive menu) may be accessed through the user interface during creation or editing of a data layer. For example, FIG. 8 is an example user interface 800 for editing parameters for a data layer for viewing machine-sourced and human-sourced network information of a network. As shown in the user interface 800, input portions are provided for defining a particular pinboard 802 or network administrator-defined group of network data, an interval 804 applied to the particular data layer, and a time-to-live (TTL) 806 for the data layer. In general, the interval 804 defines a particular window of time that data from the raw data feed is analyzed and put into the data layer. For the example illustrated, the query interval 804 is defined as one hour such that analysis of the raw data feed begins at a start time and, for the next hour, data that matches the parameters of the data layer in the raw data feed are stored in the data layer. At the expiration of the query interval 804, a new query may begin for inclusion in the data layer such that no data analysis is missed.

Similarly, the TTL 806 for the data layer defines how long the data layer information is stored before being replaced in the data layer storage. In this example, a TTL 806 of 90 days is defined, although any timeframe for TTL may be defined through the user interface 800. Typically, the TTL 806 for a data layer is longer than a TTL for the raw data as it is assumed that data layer information is more valuable to a network administrator than raw data and thus is made available through the user interface for a longer time than the raw data.

Figure 9:
FIG. 9 is an example user interface for providing network data-specific parameters for a data layer for viewing machine-sourced and human-sourced network information of a network.

Another user interface 900 example provides for other parameters defining the network data of the raw data feed that is included in the data layer. In particular, FIG. 9 is an example user interface 900 for providing network data-specific parameters for a data layer for viewing machine-sourced and human-sourced network information of a network. Through this interface 900, the network administrator may define particular search terms 902 and sections of data 904 from which the data of the raw data feed is included in the data layer. In the illustrated example of FIG. 9, a particular search term "wcerr" is provided in box 902 corresponding to page "West Coast Servers" and section "Sec1" of a network to define layer parameters of errors received from servers designated as west coast servers of a particular network. In other words, data in the raw data feed (both human-sourced data and machine-sourced data) may include the search term "wcerr" or other terms associated with errors of the west coast servers of the network. This data may then be identified as belonging to a data layer and included (either directly or through a copy of the data) in the data layer. A portion of the user interface 900 may also provide for a label or display name 906 to the types of collected data. In general, any search terms, data sources, or labels may be provided through the user interface 900 to define the types of data included in a particular data layer.

Figure 10:
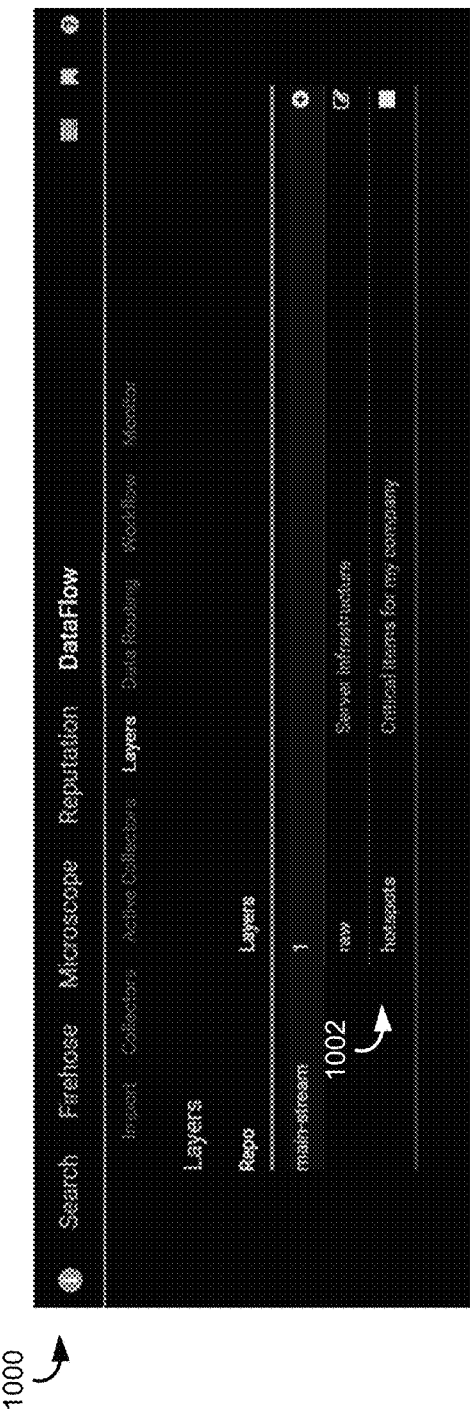
FIG. 10 is an example user interface for providing an indication of a data layer of machine-sourced and human-sourced network information of a network.

Once the data layer is defined through the provided parameters, the layer may be displayed on the user interface for use by the network administrator, as illustrated in FIG. 10. In particular, as illustrated in FIG. 10, the user interface 1000 includes a data layer 1002 included in the repository main-stream. The data layer 1002 illustrated includes data that is identified as "hotspots" for the user's network as defined through parameters provided through the user interface, as described above.

Figure 11:
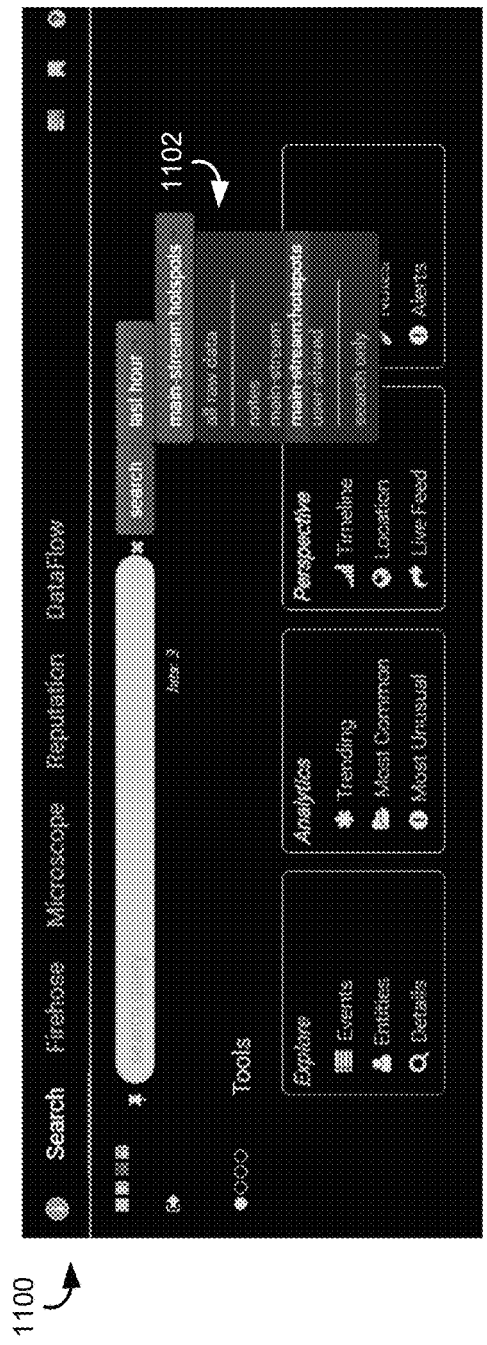
FIG. 11 is an example user interface for interacting with summary information for a data layer of machine-sourced and human-sourced network information of a network.

FIG. 11 is an example user interface 1100 for interacting with summary information for a data layer of machine-sourced and human-sourced network information of a network. For example, a network administrator may utilize the user interface's search function to search for network data or information. The search function may be integrated with the data layers. As shown in FIG. 11, the scope selector 1102 is enhanced to allow for more than one data source to be selected. In general, the data layer will not show up in the selector until there is data in the layer (at least 1 interval has passed). In the example shown, the search scope is set to search the data layer "hotspots" to obtain particular data from within the data layer. As mentioned above, as the data included in the data layer is less than the raw data feed, creation of and searching through a data layer makes for easier management of the network without consuming vast network resources and administrator time.

Figure 12:
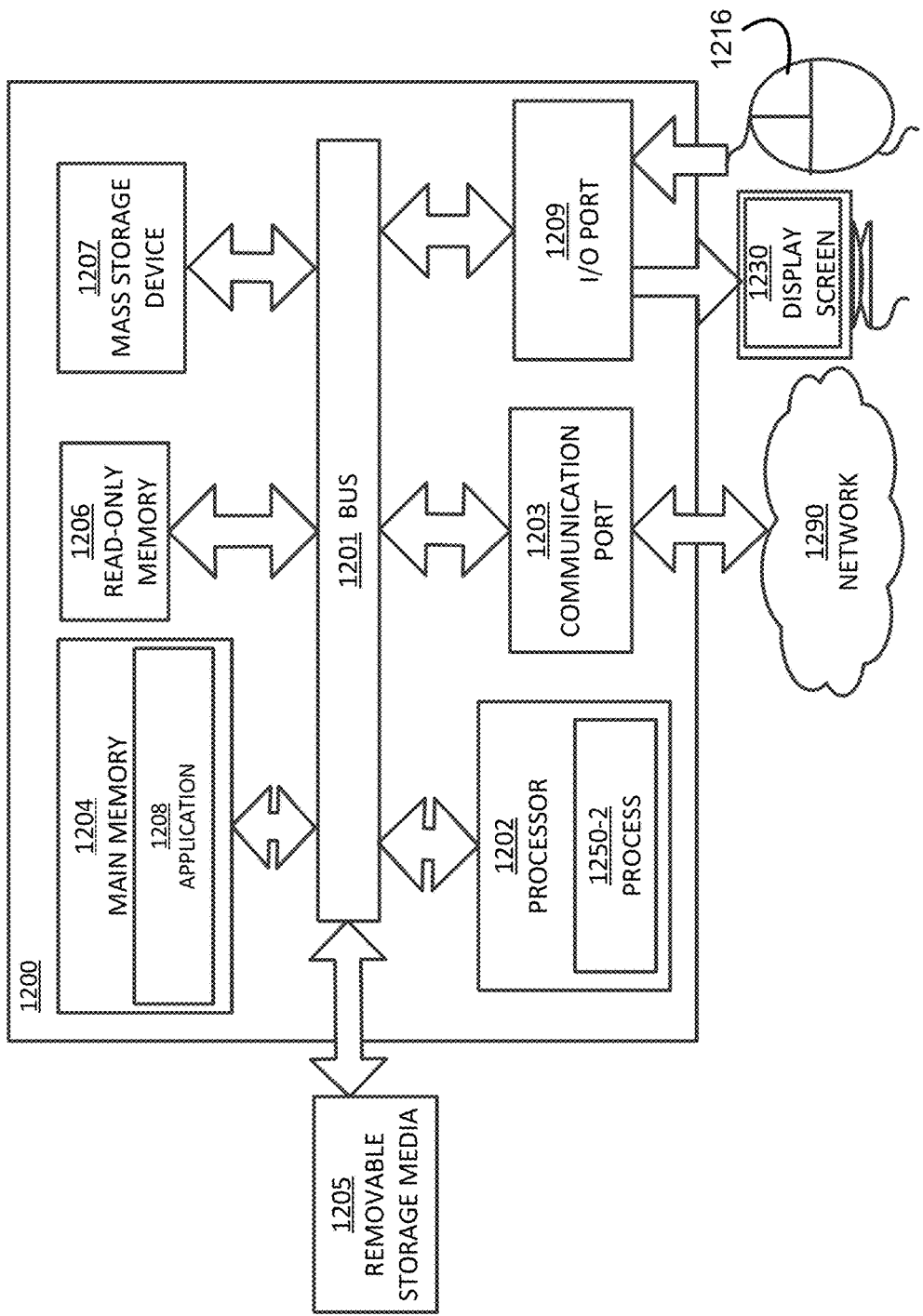
FIG. 12 is an example of a computing system that may implement various systems, network elements, and methods discussed herein.

FIG. 12 is an example schematic diagram of a computing system 1200 that may implement various methodologies discussed herein. The computing system for the application 1208 includes a bus 1201 (i.e., interconnect), at least one processor 1202 or other compute element, at least one communication port 1203, a main memory 1204, a removable storage media 1205, a read-only memory 1206, and a mass storage device 1207. Processor(s) 1202 can be any known processor, such as, but not limited to, an Intel® Core® or Xeon® processor(s), AMD® Ryzen® or ASeries® processor(s), or any other lines of processors. Communication port 1203 can be any known network device, such as, but not limited to, an RS-232 port for use with a modem based dial-up connection, a 10/100 Ethernet port, a Gigabit/10 Gigabit port using copper or fiber, or a USB port. Communication port(s) 1203 may be chosen depending on a network 1290 such as a Local Area Network (LAN), a Wide Area Network (WAN), or any network to which the computer system 1200 connects. An executing application may be in communication with peripheral devices (e.g., display screen 1230, input device 1216 via Input/Output (I/O) port 1209.

Main memory 1204 can be Random Access Memory (RAM) or any other dynamic storage device(s) commonly known in the art. Read-only memory 1206 can be any static storage device(s) such as Programmable Read-Only Memory (PROM) chips for storing static information such as instructions for processor 1202. Mass storage device 1207 can be used to store information and instructions and may include, but is not limited to, hard disk drives (HDDs), optical disc drives, an array of disks such as Redundant Array of Independent Disks (RAID), solid state drives (SSDs), or any other type of mass storage device.

Bus 1201 communicatively couples processor(s) 1202 with the other memory, storage and communications blocks. Bus 1201 can be, but is not limited to, a PCI/PCI-X/PCIe, SCSI, or Universal Serial Bus (USB) based system bus (or other) depending on the storage devices used. Removable storage media 1205 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

I claim:

1. A method for managing a network of computing devices, the method comprising:
   receiving, through a user interface, a plurality of data layer parameters comprising identifications of network operation information and a start time for obtaining the network operation information;
   collecting, at a collector component of a network management system, a raw data network information feed comprising machine sourced information from one or more devices of the network of computing devices and human sourced information from the one or more third party systems in communication with the network management system;
   correlating a portion of the raw data network information feed with the identifications of network operation information and the start time of the received plurality of data layer parameters;
   storing the portion of the raw data network information feed as a layer of network data in a storage device;
   receiving a search query from a user of the network management system through the user interface, the search query comprising an indication of an aspect of the raw data network information stored as the layer of network data in the storage device;
   accessing the layer of network data in the storage device based on the received search query to obtain a portion of the layer of network data corresponding to the search query; and
   providing the portion of the layer of network data corresponding to the search query to the user of the network management system.

2. The method of claim 1 wherein the plurality of data layer parameters further comprises an external data service for processing the portion of the raw data network information of the layer of network data, the method further comprising:
   transmitting the portion of the raw data network information to the external data service.

3. The method of claim 2 further comprising:
   receiving a resulting data information from the external data service; and
   storing the resulting data information in the layer of network data in the storage device.

4. The method of claim 3 wherein the portion of the raw data network information of the layer of network data comprises Internet Protocol (IP) addresses associated with requests for access to a network device of the network of computing devices and the external data service is an IP address reputation service.

5. The method of claim 1 wherein the plurality of data layer parameters further comprises a stop time for obtaining the network operation information, the method further comprising:
   stopping the storing of the portion of the raw data network information feed of the layer of network data at the stop time.

6. The method of claim 5 wherein the start time for obtaining the network operation information is a first date and the stop time for obtaining the network operation information is a second date different than the first date.

7. The method of claim 1 wherein the portion of the raw data network information of the layer of network data comprises a first number of network events, the first number of network events being less than a number of network events in a group of stored raw data network information.

8. The method of claim 7 wherein the number of network events in a group of stored raw data network information corresponds to received network events occurring from a raw data block beginning time to a raw data block end time, the number of network events corresponding to an amount of raw data manageable by a database of a network management system.

9. The method of claim 8 wherein the portion of the raw data network information of the layer of the network data occurs between the raw data block beginning time and the raw data block end time.

10. The method of claim 7 wherein the plurality of data layer parameters further comprises a time-to-live (TTL) value that defines a time limit for storing the portion of the raw data network information as the layer of network data in the storage device.

11. The method of claim 10 wherein the TTL value of the plurality of data layer parameters is longer than a TTL value for the group of stored raw data network information.

12. The method of claim 1 wherein the plurality of data layer parameters is received through the user interface from a network maintenance system comprising at least one network monitoring device.

13. The method of claim 1 wherein storing the portion of the raw data network information feed as a layer of network data in a storage device comprises storing a copy of the portion of the raw data network information feed as the layer of network data.

14. A system for managing a computer network, the system comprising:
   a communication port for communication with one or more devices of the computer network and one or more third party systems;
   a collector component receiving a raw data network information feed comprising machine sourced information from the one or more devices of the computer network and human sourced information from the one or more third party systems;
   a database storing the raw data network information feed in a first number of network event blocks; and
   a computing device executing a user interface application, the computing device:
      receiving, through the user interface, a plurality of data layer parameters comprising identifications of network operation information and a start time for obtaining the network operation information;
      correlating a portion of the raw data network information feed with the identifications of network operation information and the start time of the received plurality of data layer parameters into a layer of network data;
      receiving a search query from a user of the computing device, the search query comprising an indication of an aspect of the layer of network data;
      accessing the layer of network data based on the received search query to obtain a portion of the layer of network data corresponding to the search query; and providing the portion of the layer of network data corresponding to the search query to the user of the network management system through the user interface.

15. The system of claim 14 wherein the plurality of data layer parameters further comprises an external data service for processing the portion of the raw data network information of the layer of network data, the computing device further:
transmitting the portion of the raw data network information to the external data service.

16. The system of claim 15 wherein the computing device further:
receiving a resulting data information from the external data service; and
correlating the resulting data information from the external data service in the layer of network data.

17. The system of claim 16 wherein the portion of the raw data network information of the layer of network data comprises Internet Protocol (IP) addresses associated with requests for access to a network device of the network of computing devices and the external data service is an IP address reputation service.

18. The system of claim 14 wherein the portion of the raw data network information of the layer of network data comprises a second number of network events, the second number of network events being less than the first number of network event blocks of the stored raw data network information.

19. The system of claim 18 wherein the first number of network events of the stored raw data network information corresponds to received network events occurring from a raw data block beginning time to a raw data block end time, the first number of network events corresponding to an amount of raw data manageable by the database.

20. The system of claim 19 wherein the portion of the raw data network information of the layer of the network data occurs between the raw data block beginning time and the raw data block end time.

21. The system of claim 16 wherein the plurality of data layer parameters further comprises a time-to-live (TTL) value that defines a time limit for storing the portion of the raw data network information as the layer of network data in the database.

22. The system of claim 21 wherein the TTL value of the plurality of data layer parameters is longer than a TTL value for the first number of network event blocks of the stored raw data network information.

23. The system of claim 14 wherein the plurality of data layer parameters is received through the user interface from a network maintenance system comprising at least one network monitoring device.

24. The system of claim 14 further comprising a display device displaying the portion of the layer of network data corresponding to the search query to the user of the network management system through the user interface.

* * * * *